(12) United States Patent
Deal et al.

(10) Patent No.: US 6,263,699 B1
(45) Date of Patent: Jul. 24, 2001

(54) SEPARATION OF A TWO PHASE MIXTURE BY FREEZING

(75) Inventors: Martyn John Deal, Stevanage; Michael Carl Hawes, Exeter, both of (GB)

(73) Assignee: Radleys Combi-Chem, Ltd. (GB)

( * ) Notice: Subject to any disclaimer, the term of this patent is extended or adjusted under 35 U.S.C. 154(b) by 0 days.

(21) Appl. No.: 09/423,789

(22) PCT Filed: May 12, 1998

(86) PCT No.: PCT/EP98/02752

§ 371 Date: Feb. 4, 2000

§ 102(e) Date: Feb. 4, 2000

(87) PCT Pub. No.: WO98/51393

PCT Pub. Date: Nov. 19, 1998

(51) Int. Cl.[7] ........................................... B01D 9/04
(52) U.S. Cl. ................................... 62/532; 62/62
(58) Field of Search ....................... 62/123, 532, 529, 62/530, 531, 62

(56) References Cited

U.S. PATENT DOCUMENTS

| | | | |
|---|---|---|---|
| 686,268 | * 11/1901 | Dery | 62/531 |
| 1,688,815 | * 10/1928 | Kobash | 62/531 |
| 2,190,280 | * 2/1940 | Banigan et al. | 62/532 |
| 2,997,858 | * 8/1961 | Perez | 62/529 |
| 3,966,445 | * 6/1976 | Adams | 62/532 |
| 4,365,481 | 12/1982 | Pearlstein et al. | 62/123 |

FOREIGN PATENT DOCUMENTS

| | | | |
|---|---|---|---|
| 2712632 | 10/1977 | (DE) . | |
| 1533303 | 11/1978 | (GB) | B01D/9/02 |
| 2529387A | 11/1978 | (DE) . | |
| 02198602A | 8/1990 | (JP) . | |
| 1716976A | 2/1992 | (SU) . | |

\* cited by examiner

*Primary Examiner*—Ronald Capossela
(74) *Attorney, Agent, or Firm*—Michael D. Rechtin; Foley & Lardner

(57) ABSTRACT

The present invention provides a method for the separation and isolation of a water-immiscible organic phase and an aqueous phase from a two phase mixture which comprises insertion of a pin into the two phase mixture such that it extends into the aqueous phase, cooling the two phase mixture with the pin inserted until the aqueous phase solidifies, and removal of the pin with the solidified aqueous attached.

8 Claims, 3 Drawing Sheets

A Method For The Separation and Isolation of Water Immiscible Organic Phase and An Aqueous Phase From A Two Phase Mixture

SEPARATION OF A TWO PHASE MIXTURE BY FREEZING

The present invention relates to a method and device for the separation and isolation of an organic and aqueous phase from a two phase mixture. In particular it relates to an apparatus which is adapted to the separation of mixtures obtained via combinatorial chemistry processes.

In carrying out the syntheses of organic chemical compounds, a reaction mixture is generated that contains both the desired product and one or more unwanted impurities following the appropriate chemical reaction.

The problem of isolating the desired organic product from a reaction mixture is particularly acute in the field of combinatorial chemistry. Combinatorial chemistry allows many structurally related compounds to be generated simultaneously from the addition of a series of building blocks in a known sequence, thereby decreasing the time involved to identify a compound of interest.

Generally, the combinatorial chemistry process is initiated by attaching the first set of building blocks to a solid support. After each reaction with a building block, the products which remain attached to the solid support are isolated prior to the addition of the next building block. The solid support is then removed from the final desired product.

The disadvantages of producing compounds using the solid support method include the complications involved in linking and detaching the solid support from the organic components and the filtering of many individual solutions in order to isolate the desired products.

An alternative method of obtaining pure compounds via a combinatorial chemistry process has now been found which employs a two phase liquid system, namely a water-immiscible organic phase and an aqueous phase, in order to partition the desired product and the undesired impurities. Such a method removes the need for a solid support. Although two phase partitioning is employed as a separation technique in the synthesis of individual compounds, this method has not been used in the field of combinatorial chemistry due to the extensive amount of time that is required to separate the two phases at each stage for each compound.

A novel method for purifying the numerous mixtures produced by combinatorial chemistry has been identified that makes the use of a two phase liquid system viable. This method involves the solidification of the aqueous phase from a two phase mixture, allowing the desired product and impurities produced in a chemical reaction to be partitioned into separate phases and hence separated. The method can also be used for separating mixtures obtained from a single reaction.

Thus, the present invention provides a method for the separation and isolation of a water-immiscible organic phase and an aqueous phase from a two phase mixture which comprises insertion of a pin into the phase mixture such that it extends into the aqueous phase, cooling the two phase mixture with the pin inserted until the aqueous phase solidifies, and removal of the pin with the solidified aqueous phase attached.

The "pin" which is inserted into the two phase mixture can be any suitable elongate member of any suitable shape or size and includes such readily available materials as nails and screws and can be made of a substance which has good chemical resistivity and can therefore be used numerous times without corrosion. For example, the pin can made from strips of flat material, either as a plane or in other suitable configurations, such as a cross, or it could be a wire loop, such as is commonly used for picking and spreading bacterial cultures. The pin can be made from other suitable materials, for example polymers, more particularly polyetheretherketone (PEEK).

The pin is made preferably from metal, for example stainless steel.

The pin may have smooth sides or, preferably, be profiled in such a way so as to prevent the solidified aqueous phase from falling off the pin when the pin is removed from the mixture.

The chemical reaction is preferably carried out in a container made of a material which possesses good chemical resistivity, for example Teflon. Ideally, for the cooling process the mixture is contained in a suitable vessel that can be cooled effectively, for example polypropylene micronic tubes.

The solvent that is used for the chemical reaction is removed, for example by vacuum centrifugation, and both an aqueous phase, such as water and a suitable water-immiscible organic solvent, for example ethyl acetate, are added to the container which is then shaken in order to achieve complete dissolution. The two phase mixture is transferred to a suitable vessel in which the temperature of the mixture can be lowered to below the freezing point of the aqueous phase, for example $-20°$ C. to $-78°$ C. The reduction in temperature may be reflected by any suitable means including, for small reaction volumes, cooling the aqueous phase directly with the pins.

The vessel in which the two phase mixture is to be cooled is preferably tapered towards the bottom, for example a micronic tube. If the aqueous phase is the lower of the two phases, the organic phase is then above to flow over the solidified aqueous phase when the aqueous phase is removed from the container. Upon solidifying, the lower aqueous layer forms a 'plug' which is moulded to the shape of the lower part of the vessel. Thus, when the solidified aqueous phase is raised into the wider part of the vessel, the upper organic phase can flow over the plug and remain in the vessel. The solidified aqueous phase can be transferred to a separate empty vessel, thus effecting the separation of the two phases.

In order to purify the compound of interest dissolved in the organic phase further, the process may be repeated any number of times. For example, a further aqueous phase such as a solution of sodium carbonate solution may be added to the remaining organic phase, the mixture thoroughly mixed and the process of inserting the pin, followed by cooling to below the freezing point of the aqueous phase, for example below $-20°$ C. and the removal of the solidified aqueous phase is repeated. This process may be repeated using another appropriate aqueous phase such as another portion of sodium carbonate solution to yield the isolated compound of interest.

The aqueous phase can form either the upper or lower layer in the two phase mixture depending upon the relative density of the organic phase to that of the aqueous phase. If the aqueous phase is the upper of the two phases, the solidified aqueous phase can simply be lifted out of the vessel leaving the organic phase undisturbed.

If the compound of interest is dissolved in the aqueous phase, a volume of the water-immiscible organic solvent is added to the isolated aqueous phase, the mixture if thoroughly mixed and the process of inserting the pin, followed by cooling and the removal of the solidified aqueous phase is repeated. This process is repeated once more using another portion of water-immiscible organic solvent to yield the isolated compound of interest.

The aqueous phase in the two phase mixture can be either acidic, basic or neutral. Any water-immiscible organic solvent can be used as the organic phase, for example ethyl acetate, so long as the selected organic solvent when combined with the aqueous phase results in complete dissolution of the reaction mixture.

The volume of the aqueous layer is for example in the range of 50 μl to 8 ml μl, for example 250 μl. The volume of the water-immiscible organic solvent is for example in the range of 250 μl to 8 ml, for example 500 μl.

The pin is preferably attached to a supporting block in order to make both the insertion and removal of the pin as smooth as possible. For example, the pin is attached at one end to the supporting block in a perpendicular fashion. The supporting block is preferably made of a solid material to give the apparatus stability, for example wood or preferably aluminium or Teflon.

As discussed, the present invention may be used to separate the water-immiscible organic and the aqueous phases in a two phase mixture for an individual reaction mixture in which case a single pin is required. When a number of reaction mixtures are involved, a number of pins can be attached to a supporting block in such a way that the pins can be inserted into any number of vessels containing two phase mixtures simultaneously. Such an apparatus would be applicable in the field of combinatorial chemistry in which many reaction mixtures, of generally small volumes, need to purified.

The number of pins attached to the supporting block can be varied to match the number of vessels containing the two phase liquid solutions. The number of vessels used in a typical combinatorial chemistry reaction is greater than two, for example 12, 24, 48, 79, 96, 384.

A preferred embodiment of the invention is described in detail below, by example only, with reference to the accompanying drawings, wherein:

FIG. 1 is a schematic representation of the tapered vessel 1 containing the two phase liquid system.

FIG. 2 is a schematic representation of the profiled pin 4 located in a supporting block 5 prior to its insertion into the two phase mixture 2, 3.

Figure 1:
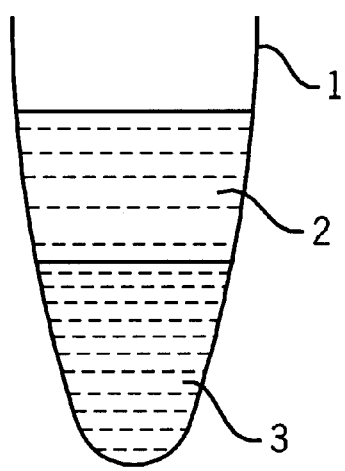
Figure 2:
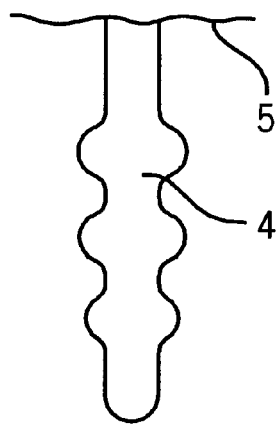
Figure 3:
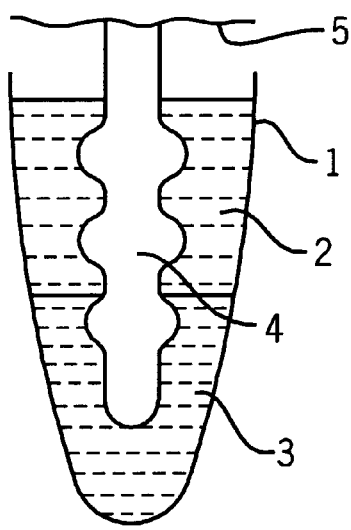
FIG. 3 is a schematic representation of the profiled pin 4 inserted in the two phase mixture 2, 3 prior to cooling the mixture.

Referring to FIG. 3, when the lower phase 3 is the aqueous phase, the pin 4 is preferably immersed in the two phase mixture such that it extends a substantial distance into the lower aqueous phase 3, for example as shown.

Figure 4:
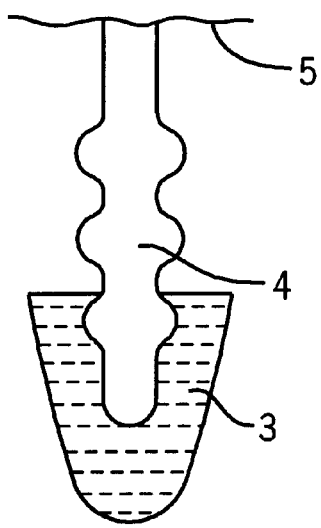
FIG. 4 is a schematic representation of the profiled pin 4 after the aqueous phase has solidified and has been removed from the phase mixture when the aqueous phase is the lower phase.

Referring to FIG. 4, the pin 4 is removed from the tapered vessel 1 following the solidification of the aqueous phase. The solidified aqueous phase is attached at the bottom of the pin where it can be transferred to a separate empty vessel.

Figure 5:
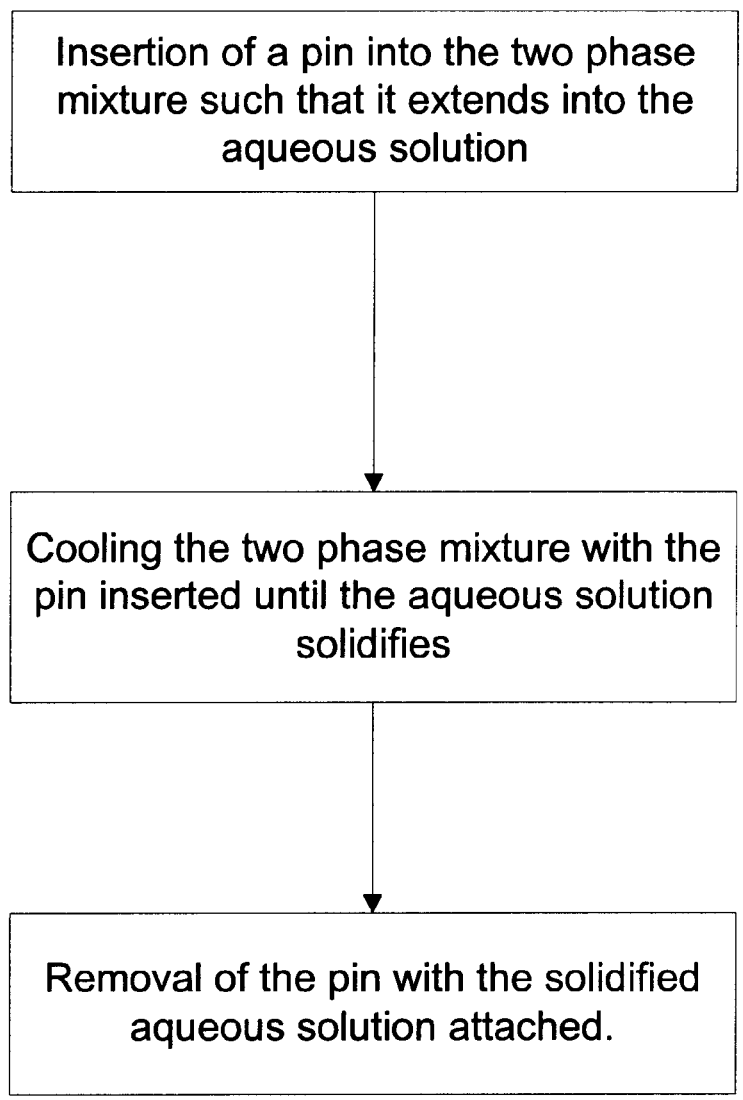
FIG. 5 is a block diagram illustrating a method for the separation and isolation of water immiscible organic phase and an aqueous phase from a two phase mixture.

The following Example illustrates the invention:

Referring to FIG. 5, a method for the separation and isolation of water immiscible organic phase and an aqueous phase from a two phase mixture includes inserting a pin into the two phase mixture such that it extends into the aqueous phase, cooling the two phase mixture with the pin inserted until the aqueous phase solidifies, and removing the pin with the solidified aqueous phase attached.

Figure 6:
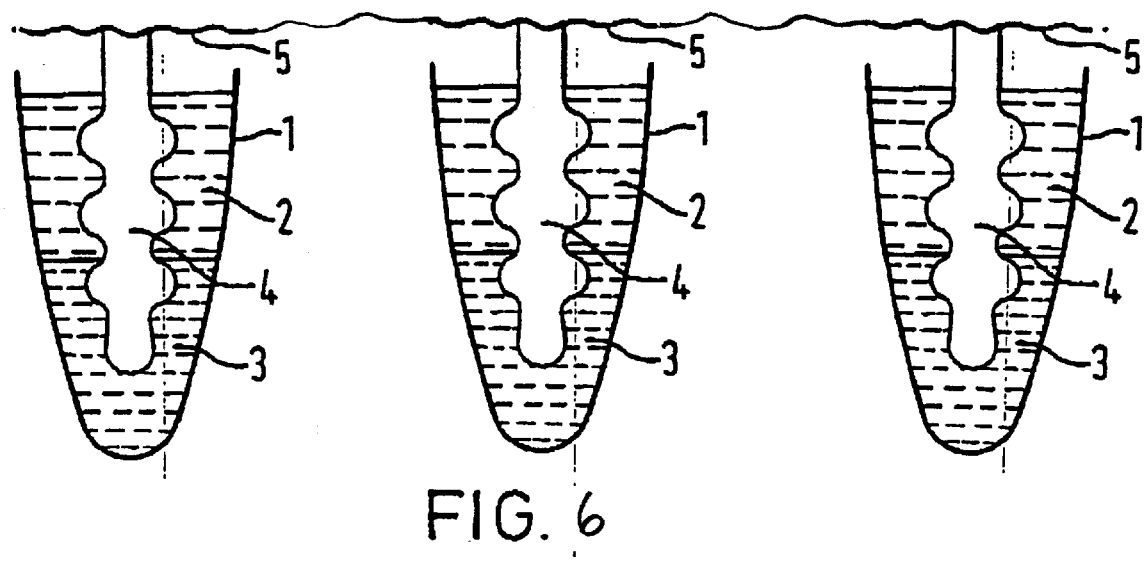
FIG. 6 is a schematic representation of a plurality of profiled pins 4 inserted into a plurality of two phase mixtures 2, 3 prior to cooling the mixture.

Referring to FIG. 6, three pins 4 are attached to the supporting block 5. Each of the three pins 4 is inserted into a separate vessel 1 containing the two phase mixture 2 and 3.

EXAMPLE

A stock solution of 1-hydroxybenzotriazole (HOBT) (405 mg, 3 mmol) and 1-(3-dimethylaminopropyl)-3-ethyl-carbodiimide hydrochloride (WSCDI) (575 mg, 3 mmol) in DMF (30 ml) was prepared. A stock solution of p-nitrophenethyl amine hydrochloride (606 mg, 3 mmol) and triethylamine (303 mg, 3 mmol) in dimethylformamide (30 ml) was prepared.

1. To each well of a microtitre plate containing Bestacid set (79 acids) (25 μmol per well) (diisopropylethylamine salt) were added the HOBT and WSCDI solution (250 μl, 250 μmol). The reaction was left to stand for 18 hours, after which the solvent was removed by vacuum centrifugation to give reaction mixtures 1–79.

2. To each well of the microtitre plate was added ethyl acetate (500 μl) and water (250 μl). The plate was shaken to dissolve the solid and the solutions transferred to 79 micronic tubes. Into each tube was lowered a nail such that the head of the nail entered the aqueous layer and the sharp end fixed into the piece of wood. All of the nails were attached to a single piece of wood. The aqueous layers were frozen at −20° C.→−25° C. and all the nails were removed from the tubes simultaneously with the aqueous layers frozen to them. This process was repeated with two sodium carbonate washes (250 μl) to give compounds 1–79.

Bestacid is a set of carboxylic acids which are selected for their reactivity and are known to incorporate groups which add advantageous characteristics to the final compound for use as a pharmaceutical medicament.

The following table sets out the molecular weight of Bestacid used in each reaction, together with the theoretical molecular weight of the expected product.

The quality of the crude reaction mixture prior to work-up was tested using LCMS. Two ticks (✓✓) represent that the desired product and the known by-product of the reaction only are present; one tick plus a tick in brackets (✓(✓) denotes that the desired product, the known by-product and an insignificant amount of other impurities are present; one tick (✓) denotes that the desired product, the known by-product and a significant amount of other impurities are present, although the level of impurities are acceptable for the process of combinatorial chemistry.

The quality of the reaction mixture following the isolation of the two phases was tested using LCMS. Two ticks denote that only the desired product is present (i.e. only one LCMS peak is visible); one tick plus a tick in brackets denotes that the desired product and an insignificant amount of other impurities is present, one tick denotes that the desired product and a significant, but still acceptable, amount of other impurities are present.

The removal of the known impurity is assessed using LCMS. Two ticks denote that all of the known by-product is removed; one tick plus a tick in brackets denotes that the desired product and an insignificant amount of the known by-product is present; one tick denotes that the desired product and a significant, but still acceptable, amount of the known by-product are present.

| Compound No. | MWT Acid | M. Wt of Product | Quality of Crude | Quality After Isolation | Removal of impurity? |
|---|---|---|---|---|---|
| 1 | 123.11 | 271 | ✓✓ | ✓✓ | ✓✓ |
| 2 | 175.19 | 323 | ✓✓ | ✓✓ | ✓✓ |
| 3 | 212.25 | 360 | ✓✓ | ✓✓ | ✓✓ |
| 4 | 179.18 | 327 | ✓✓ | ✓✓ | ✓✓ |
| 5 | 123.11 | 271 | ✓✓ | ✓✓ | ✓✓ |
| 6 | 112.09 | 200 | ✓✓ | ✓✓ | ✓✓ |
| 7 | 112.09 | 260 | ✓✓ | ✓✓ | ✓(✓) |
| 8 | 128.15 | 276 | ✓✓ | ✓✓ | ✓✓ |
| 9 | 193.2 | 341 | ✓✓ | ✓✓ | ✓✓ |
| 10 | 226.28 | 374 | ✓✓ | ✓✓ | ✓✓ |
| 11 | 123.11 | 271 | ✓✓ | ✓✓ | ✓✓ |
| 12 | 106.14 | 254 | ✓ | ✓ | ✓ |
| 13 | 152.15 | 300 | ✓✓ | ✓✓ | ✓✓ |
| 14 | 152.15 | 300 | ✓✓ | ✓✓ | ✓✓ |
| 15 | 152.15 | 300 | ✓✓ | ✓✓ | ✓✓ |
| 16 | 137.11 | 285 | ✓✓ | ✓✓ | ✓✓ |
| 17 | 126.11 | 274 | ✓✓ | ✓✓ | ✓✓ |
| 18 | 142.18 | 290 | ✓✓ | ✓✓ | ✓✓ |
| 19 | 192.22 | 340 | ✓✓ | ✓✓ | ✓✓ |
| 20 | 161.16 | 309 | ✓✓ | ✓✓ | ✓✓ |
| 21 | 175.19 | 323 | ✓✓ | ✓✓ | ✓✓ |
| 22 | 173.17 | 321 | ✓✓ | ✓✓ | ✓✓ |
| 23 | 161.16 | 309 | ✓✓ | ✓✓ | ✓✓ |
| 24 | 137.14 | 285 | ✓✓ | ✓✓ | ✓✓ |
| 25 | 165.19 | 313 | ✓✓ | ✓✓ | ✓✓ |
| 26 | 138.12 | 286 | ✓✓ | ✓✓ | ✓✓ |
| 27 | 128.17 | 276 | ✓✓ | ✓✓ | ✓✓ |
| 28 | 128.17 | 276 | ✓ | ✓(✓) | ✓(✓) |
| 29 | 142.2 | 290 | ✓✓ | ✓✓ | ✓✓ |
| 30 | 122.12 | 270 | ✓✓ | ✓✓ | ✓✓ |
| 31 | 152.15 | 300 | ✓✓ | ✓✓ | ✓✓ |
| 32 | 165.19 | 313 | ✓✓ | ✓✓ | ✓✓ |
| 33 | 166.18 | 314 | ✓✓ | ✓✓ | ✓✓ |
| 34 | 182.15 | 310 | ✓✓ | ✓✓ | ✓✓ |
| 35 | 143.17 | 291 | ✓✓ | ✓✓ | ✓✓ |
| 36 | 104.11 | 252 | ✓ | ✓(✓) | ✓(✓) |
| 37 | 146.16 | 293 | ✓✓ | ✓✓ | ✓✓ |
| 38 | 131.13 | 279 | ✓✓ | ✓✓ | ✓✓ |
| 39 | 120.17 | 268 | ✓✓ | ✓✓ | ✓✓ |
| 40 | 116.12 | 264 | ✓✓ | ✓✓ | ✓✓ |
| 41 | 182.18 | 330 | ✓✓ | ✓✓ | ✓✓ |
| 42 | 166.18 | 314 | ✓✓ | ✓✓ | ✓✓ |
| 43 | 212.25 | 360 | ✓✓ | ✓✓ | ✓✓ |
| 44 | 173.17 | 321 | ✓✓ | ✓✓ | ✓✓ |
| 45 | 137.14 | 285 | ✓✓ | ✓(✓) | ✓✓ |
| 46 | 194.19 | 342 | ✓✓ | ✓✓ | ✓✓ |
| 47 | 136.15 | 284 | ✓✓ | ✓✓ | ✓✓ |
| 48 | 180.16 | 328 | ✓✓ | ✓ | ✓✓ |
| 49 | 166.18 | 314 | ✓✓ | ✓ | ✓✓ |
| 50 | 173.17 | 321 | ✓✓ | ✓✓ | ✓✓ |
| 51 | 118.09 | 266 | ✓✓ | ✓✓ | ✓✓ |
| 52 | 137.14 | 285 | ✓ | ✓ | ✓✓ |
| 53 | 179.22 | 327 | ✓✓ | ✓✓ | ✓✓ |
| 54 | 193.2 | 341 | ✓✓ | ✓✓ | ✓✓ |
| 55 | 176.22 | 324 | ✓✓ | ✓✓ | ✓✓ |
| 56 | 166.18 | 314 | ✓✓ | ✓✓ | ✓✓ |
| 57 | 76.05 | 224 | ✓✓ | ✓✓ | ✓✓ |
| 58 | 152.15 | 300 | ✓ | ✓(✓) | ✓(✓) |
| 59 | 161.16 | 309 | ✓✓ | ✓✓ | ✓✓ |
| 60 | 150.18 | 298 | ✓ | ✓✓ | ✓✓ |
| 61 | 116.12 | 264 | ✓✓ | ✓✓ | ✓✓ |
| 62 | 189.21 | 337 | ✓✓ | ✓✓ | ✓✓ |
| 63 | 147.13 | 295 | ✓✓ | ✓✓ | ✓✓ |
| 64 | 186.21 | 334 | ✓✓ | ✓✓ | ✓✓ |
| 65 | 103.12 | 251 | ✓✓ | ✓✓ | ✓✓ |
| 66 | 180.16 | 328 | ✓✓ | ✓✓ | ✓✓ |
| 67 | 182.24 | 330 | ✓✓ | ✓✓ | ✓✓ |
| 68 | 187.20 | 335 | ✓✓ | ✓✓ | ✓✓ |
| 69 | 162.19 | 310 | ✓✓ | ✓✓ | ✓✓ |
| 70 | 162.19 | 310 | ✓✓ | ✓✓ | ✓✓ |
| 71 | 188.18 | 336 | ✓✓ | ✓✓ | ✓✓ |
| 72 | 152.15 | 300 | ✓✓ | ✓✓ | ✓✓ |
| 73 | 166.18 | 314 | ✓✓ | ✓✓ | ✓✓ |
| 74 | 166.18 | 314 | ✓✓ | ✓✓ | ✓✓ |
| 75 | 166.18 | 314 | ✓✓ | ✓✓ | ✓✓ |
| 76 | 180.17 | 308 | ✓✓ | ✓✓ | ✓✓ |
| 77 | 180.21 | 328 | ✓✓ | ✓✓ | ✓✓ |
| 78 | 180.16 | 328 | ✓✓ | ✓✓ | ✓✓ |
| 79 | 170.19 | 318 | ✓✓ | ✓✓ | ✓✓ |
| Total→(out of 79) | | | ✓✓ | 73 | 72 | 75 |
| | | | ✓✓ | 0 | 4 | 3 |
| | | | ✓ | 5 | 3 | 1 |
| | | | ✓ | 1 | 0 | 0 |
| | | | X | 0 | 0 | 0 |

The application of which this description and claims form part may be used as a basis for priority in respect of any subsequent application. The claims of such subsequent application may be directed to any feature or combination of features described herein.

They may take the form of product, composition, process or use claims and may include, by way of example and without limitation, one or more of the following claims:

1. A method for the separation and isolation of water immiscible organic phase and an aqueous phase from a two phase mixture which comprises insertion of a pin into the two phase mixture such that it extends into the aqueous phase, cooling the two phase mixture with the pin inserted until the aqueous phase solidifies, and removal of the pin with the solidified aqueous phase attached.

2. A method according to claim 1 in which the pin is a metal pin.

3. A method according to claim 2 in which the pin is stainless steel.

4. A method according to claim 1 in which the pin is profiled.

5. A method according to claim 1 in which the two phase mixture is contained within a tapered well.

6. A method according to claim 1 in which the pin is attached to a supporting block.

7. A method according to claim 6 in which the water immiscible organic phase and the aqueous phase from the two phase mixture are initially disposed within a plurality of vessels.

8. A method according to claim 7 in which a plurality of the pins is attached to the supporting block for the simultaneous separation and isolation of the water-immiscible organic phase and the aqueous phase in the plurality of vessels.

* * * * *